United States Patent [19]

Dougherty et al.

[11] 4,029,855

[45] June 14, 1977

[54] STORAGE BATTERY AND METHOD OF MAKING THE SAME

[75] Inventors: Thomas John Dougherty, Waukesha; Victor William Bast, Oconto Falls, both of Wis.

[73] Assignee: Globe-Union Inc., Milwaukee, Wis.

[22] Filed: Dec. 10, 1975

[21] Appl. No.: 639,350

[52] U.S. Cl. .................... 429/82; 29/623.1; 429/136; 429/160; 429/179
[51] Int. Cl.² .................... H01M 2/18; H01M 2/24
[58] Field of Search ........... 136/6 R, 6 A, 6 B, 6 C, 136/134, 166, 111, 145, 146, 147, 162; 429/82, 136, 160, 179; 29/623.1

[56] References Cited

UNITED STATES PATENTS

| | | | |
|---|---|---|---|
| 1,633,224 | 6/1927 | Ogden | 136/162 |
| 2,745,893 | 5/1956 | Chubb et al. | 136/146 |
| 3,558,358 | 1/1971 | Ropp | 136/6 B |
| 3,897,269 | 7/1975 | Sabatino et al. | 136/134 R |

*Primary Examiner*—Donald L. Walton
*Attorney, Agent, or Firm*—James L. Kirschnik; John Phillip Ryan

[57] ABSTRACT

A secondary storage battery and process involves combining folded positive and negative battery plates and separators to form battery elements, placing the elements within a battery container having partitions defining a plurality of battery cells, joining adjacent battery elements by an intercell connection through the partition walls by welding a positive and a negative terminal through the battery case into contact with positive and negative battery plate lugs respectively.

7 Claims, 7 Drawing Figures

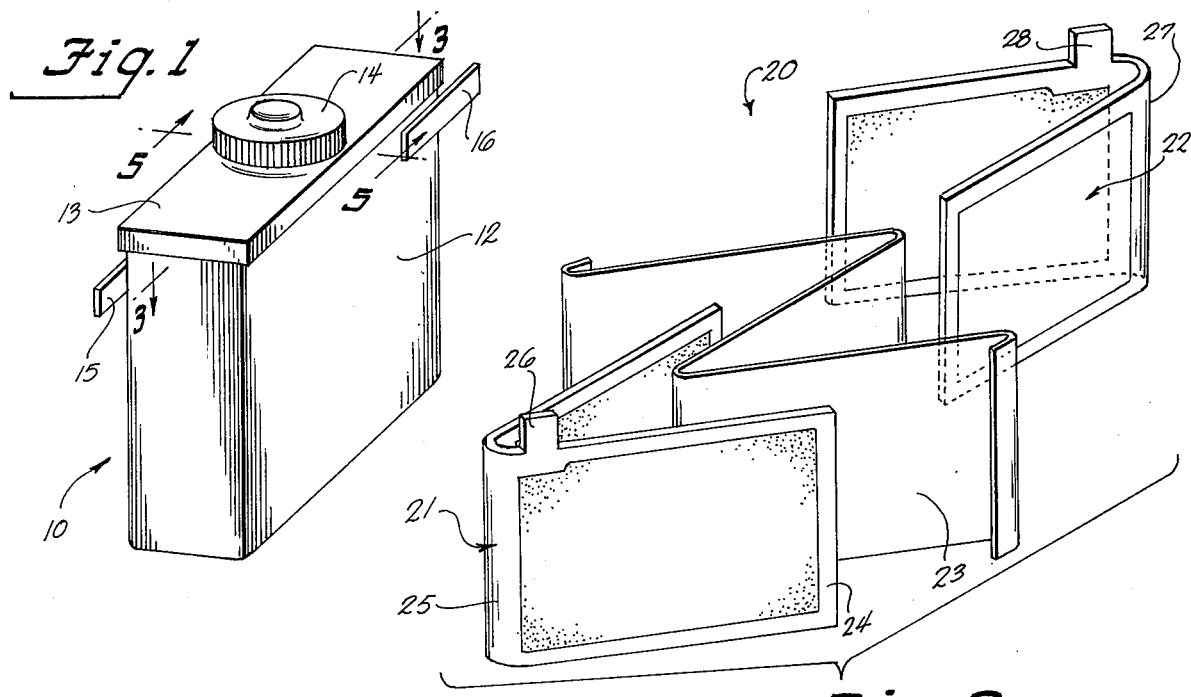
Fig. 1
Fig. 2
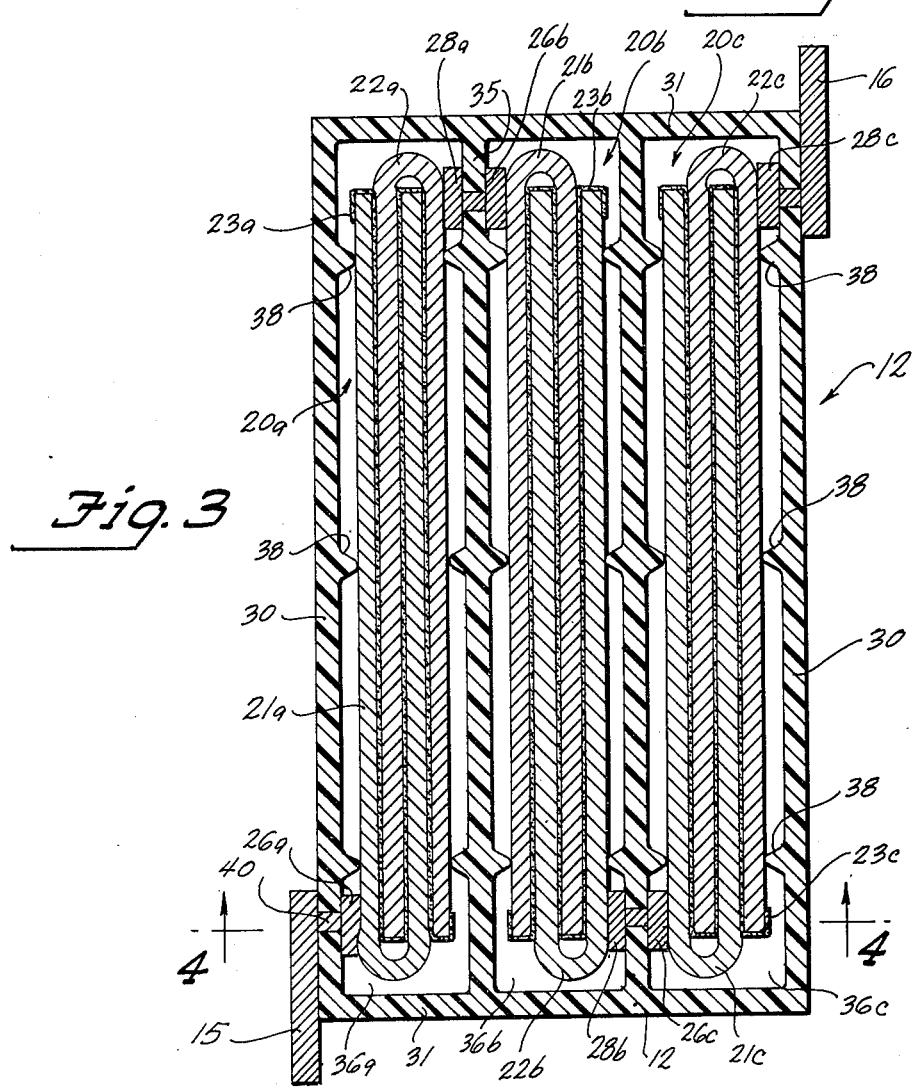
Fig. 3

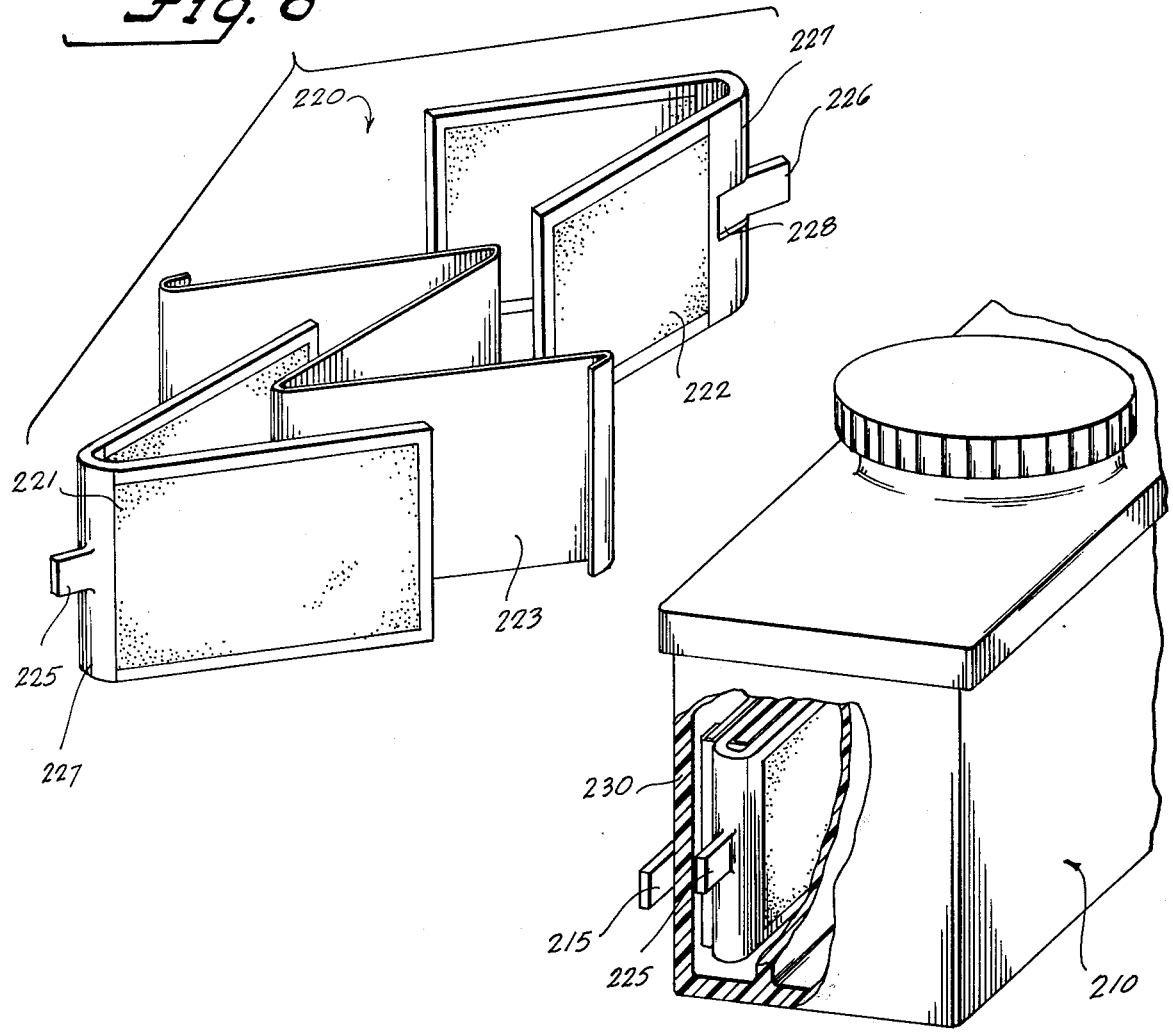

STORAGE BATTERY AND METHOD OF MAKING THE SAME

BACKGROUND OF THE INVENTION

This invention relates generally to secondary storage batteries and particularly to lead-acid type storage batteries having through the partition intercell connections.

In recent years, the lead-acid storage battery industry has developed an intercell connection in batteries in which electrical connection between adjacent battery plate elements in battery cells is made by electrically joining the elements through the battery partition walls. This type of intercell connection is seen in U.S. Pat. Nos. 3,793,086 issued Feb. 19, 1974 to Badger; 3,869,316 issued Mar. 4, 1975 to Matter; No. 3,313,658 issued Apr. 11, 1967 to Sabatino et al., and No. 3,897,269 issued July 29, 1975 to Sabatino et al, both assigned to the assignee of the present invention. The intercell connections described in the aforementioned patents basically relate to automotive type lead-acid batteries having a plurality of cells with each cell including a plurality of alternating negative and positive battery plates. The negative plates in each cell have protruding lugs which are joined together by electrically conductive connecting straps. Similarly, the positive plates in each cell have lugs which are joined by straps as well. The straps connecting the positive and negative plates are provided with an upstanding lug. The upstanding lug from a group of positive or negative plates in one cell is aligned with the upstanding lug on the group of opposite polarity plates in the adjacent cell. An aperture is provided in the cell partition wall and the lugs are joined together through the partition wall by welding to provide a connection through the aperture. The types of batteries with which these patents are concerned are adapted for use in automotive vehicles to perform such functions as providing starting, lighting and ignition. Conventionally, such batteries include a minimum number of seven or more plates in each cell. As a practical necessity within the cells, straps must be provided to couple the lugs of similar polarity plates. While Canadian Pat. No. 873,522 issued June 15, 1971 to Matter proports to show an intercell connection of a plurality of plates by directly welding a plurality of lugs together, it has been applicant's experience that such a construction is impractical for mass production of batteries. This is because the welding technique utilized to join the lugs relies upon resistance welding whereby high resistance between juxtapositioned lead parts results in generation of sufficient heat to melt the adjoining lead pieces and fluidize the lead to cause fusion. In the case of a plurality of parts having two or more interfacing surfaces, fusion does not reliably always take place at all interfaces whereby defective connections could result. It has been found that the most desirable intercell welding thus requires no more than two surfaces to be joined.

Conventional lead-acid automotive type batteries are also of an excessive capacity from that required to start small engines such as used in riding mowers, snow blowers, and the like. Such batteries generally require a fewer number of plates than are normally contained in an automotive type battery in order to provide adequate service.

SUMMARY OF THE INVENTION

It is an object of the present invention to provide a secondary storage battery and method of manufacture which is easily adaptable to mass production techniques.

A further object of the invention is to provide a secondary storage battery and method of making the same which involves less material than that used in conventional techniques.

Other objects and advantages of the present invention will become apparent from a description of the preferred embodiments which follows.

Basically the invention comprises a storage battery and method of making the same which involves providing a single positive and negative battery plate which are folded with an interspersed nonconductive separator sheet, each plate is provided with a protruding lug and a folded pair of plates and separators comprises a battery element. The lug of each plate is joined to the lug of an opposite polarity plate in an adjacent battery cell by forming a sealed fusion connection through an aperture in the partition wall. The end most plates of the battery are coupled to positive and negative battery terminals by a similar welded joint through the battery case walls.

DESCRIPTION OF THE DRAWINGS

FIG. 1 is a perspective view of a battery made according to the present invention;

FIG. 2 is a perspective exploded view of a battery element formed according to the present invention;

FIG. 3 is a view taken along line 3—3 of FIG. 1;

FIG. 6 is a perspective exploded view of an alternate battery element formed according to the invention; and FIG. 7 is a perspective partial section view of a battery made according to the alternate embodiment shown in FIG. 6.

DESCRIPTION OF A PREFERRED EMBODIMENT

Figure 4:
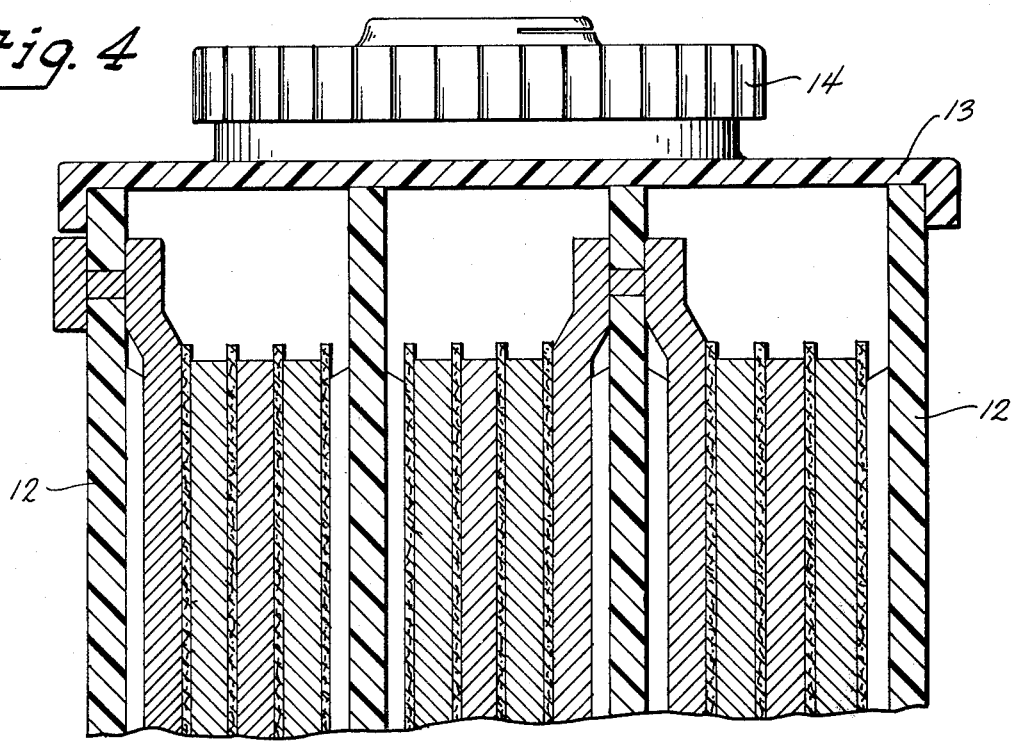
FIG. 4 is a view taken along line 4—4 of FIG. 3.

Referring to FIG. 1, a battery 10 is seen to comprise an outer case 12 having a cover 13 which may be provided with a vent cap 14 for venting gases formed within the battery in a conventional manner. Positive and negative terminals, 15 and 16 respectively, are provided.

FIG. 2 shows a battery element 20 which may be provided within each cell of the battery 10. The element 20 comprises a positive battery plate 21, a negative battery plate 22 and a porous nonconductive separator sheet 23. The positive plate 21 comprises a frame 24 and a solid vertically extending lead portion 25. Plate 21 is folded along a vertical center line through portion 25 and includes a conventional conductive lead grid within frame 24 to which lead paste is adhered. An upstanding lug 26 is provided on one half of the plate 21 adjacent to the fold line. The negative plate 22 may also comprise a similar pasted conductive lead grid. Plate 22 is folded along a vertical center line of solid portion 27 and also has an upstanding conductive lug 28 formed on one half adjacent to the fold line. The folded plates 21 and 22 are interleaved with separator 23 having corresponding folds to define a continuous nonconductive separating partition between adjacent plate surfaces. The conductive lugs 26 and 28 are positioned on diametrically opposed sides of the element assembly 20.

With reference to FIGS. 3 and 4, the internal construction of the battery 10 will now be described. The battery case 12 consists of outer side walls 30 and end walls 31 defining a hollow interior having partition walls 35 which divide the interior of the case 12 into individual battery cell compartments 36a, 36b and 36c. A battery element 20 is disposed within each of the cells 36a through 36c and hereafter, the battery elements and their associated components will be designated with a subscript "a", "b" or "c" depending upon whether they are in cells 36a, 36b or 36c respectively. As is also seen in FIG. 3, spaced ribs 38 are provided on the interior surfaces of the side walls 30 and partitions 35 in order to hold the elements 20 in spaced relationship with the side walls 30 and partitions 35. The first cell 36a has an element 20a in which the lug 26a of the positive plate 21a is sealingly coupled to the positive terminal 15 on the outside of the battery case 12 by any suitable welding connection through an aperture 40 provided within one of the side walls 30. The lug 28a of the negative plate 22a is coupled by a similar weld through its adjacent partition wall 35 to lug 26b of the positive plate 21b in the second cell 35b. Similarly, the lug 28b of the negative plate 22b of the second element is coupled by welding to lug 26c of the positive plate 21c in the third cell compartment 36c. Again, this connection is made by a suitable intercell weld through the adjacent partition wall 35. Finally, lug 28c of the negative plate 22c in the third cell is coupled to the negative terminal post 16 on the exterior of the battery case 12 by a suitable through-the-wall connection. It will thus be appreciated that the present construction illustrates a 6 volt battery having three cells 36a through 36c containing elements 20a through 20c which are comparable to conventional four plate battery constructions but which utilize a pair of folded plates instead. Obviously more or fewer cells could be provided if desired. The provision of the lugs 26a through 26c and 28a through 28c eliminates the need for a strap connection between plates of similar polarity within the cells and the intercell connection is simply made by joining a single lug within each cell with a corresponding single lug in the adjacent cell or with an external terminal 15 or 16. The folded design thus permits construction of battery elements 20 having three pieces which perform the same as conventional elements consisting of four plates and three separators thus reducing assembly time and material costs.

Figure 5:
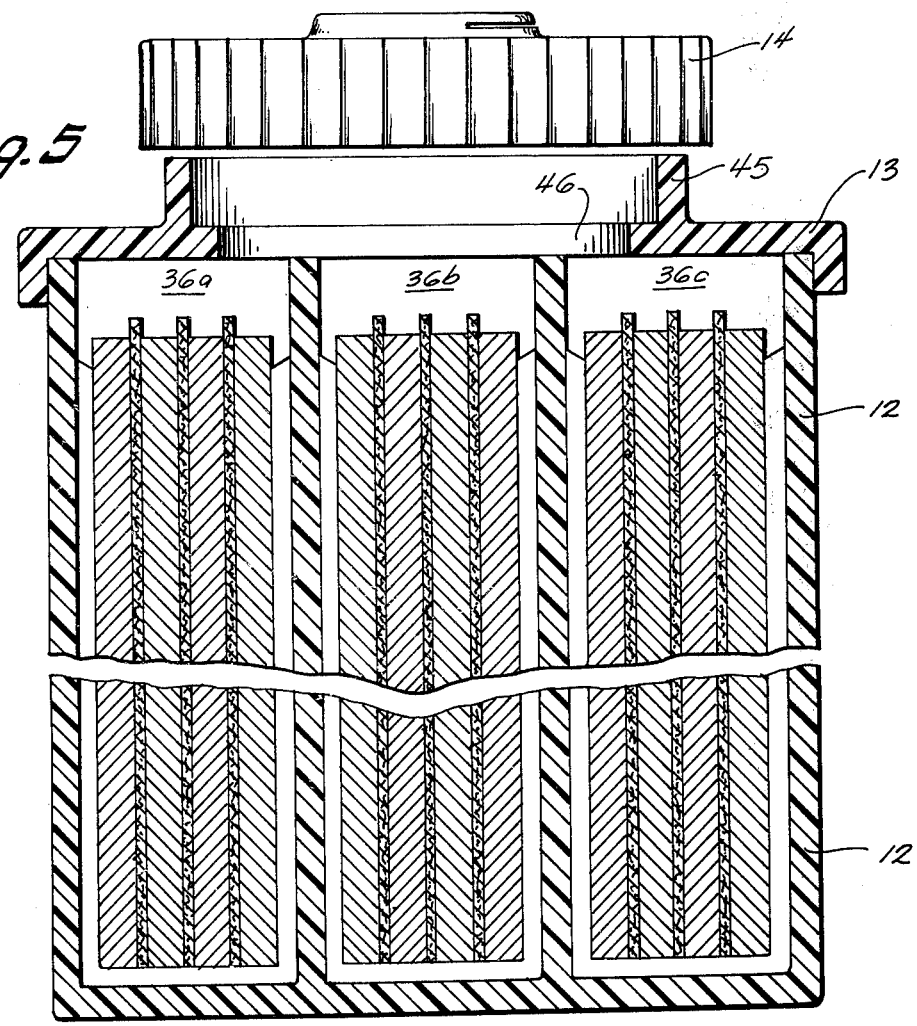
FIG. 5 is a view taken along line 5—5 of FIG. 1.

Because the present battery design is adpated for reduced capacity batteries, the case 12 has reduced external thickness with corresponding reduced individual cell sizes. Accordingly, as seen in FIG. 5, a single vent plug 14 is provided which engages an annular boss 45 formed in the cover 13 and defining an aperture 46 which opens into the interior of the battery case 12. Aperture 46 extends over the three cells 36a, 36b and 36c to permit filling of the cells with electrolyte or water through the single aperture and also allow venting of gases from the cells.

FIG. 6 illustrates an alternative construction of a battery element 220. The element 220 consists of a positive plate 221, a negative plate 222 and a separator 223 as shown in FIG. 2, however, the positive plate lug 225 and negative plate lug 226 are located centrally along a solid folded portion 227 of the plates 221 and 222 respectively. Lug 226 may be formed by cutting a "U-shaped" slot 228 in the solid portion 227 so that upon folding of the plate 222, lug 226 will extend beyond the fold line. Lug 225 of plate 221 may be similarly formed. This design is more efficient electrically as the lugs 225 and 226 are more centrally located relative to the extreme portions of the plates 221 and 222. This type of construction would necessitate a through-the-wall or through-the-partition connection as shown in FIG. 7 in which the positive lug 225 is connected to the positive terminal 215 through side wall 230 of a battery 210 as previously described. In this case, however, the connection is made below the normal level of the electrolyte within the battery 210.

While two embodiments of the invention have thus been described, it will be apparent to those skilled in the art that other variations may be possible without parting from the inventive concept. Accordingly the scope of the invention is not to be limited by the foregoing description but is to be taken solely by an interpretation of the claims which follow.

We claim:
1. A storage battery comprising:
   a battery case having a bottom and four side walls, at least one partition dividing the case into two or more cell compartments and a cover;
   a battery element disposed within each cell compartment, each element comprising a single fold positive polarity battery plate and a single fold negative polarity battery plate, each of said plates having a vertical median bighted surface at the fold and two integral substantially parallel pasted spaced apart frame members extending from the bight to provide a bifurcated plate configuration with each frame member providing a pair of pasted surfaces, each plate having a conductive lug proximate the bighted surface, said plate frame members being interleaved whereby one of the positive plate frame members extends into the bight of the negative polarity plate toward the negative bighted surface spatially separated from the negative frame members pasted surfaces, and an N-shaped nonconductive separator sheet providing separator surfaces disposed between all adjoining surfaces of said plates;
   the conductive lug of each plate being joined to the conductive lug of an opposite polarity plate in the adjoining cell by a connection through the intervening partition, and the unjoined conductive lugs of the end-most cells being coupled to the terminal posts extending outside the battery case; and
   means for venting the interior of each cell to the outside of the battery case.
2. A storage battery defined in claim 1, wherein:
   the conductive lug on each battery plate extends in the same vertical direction from a side of the battery element adjacent the bighted portions.
3. A storage battery as defined in claim 1 wherein:
   the conductive lug on each battery plate extends outwardly from the fold of the bighted portion transversely to the fold line.
4. A storage battery as defined in claim 1, wherein:
   the unjoined lugs of the end-most cells being coupled to terminal posts by a sealed connection through a side wall of the battery case.
5. The method of making a storage battery comprising the steps of:

providing a battery case having bottom and side walls and at least one partition dividing the interior of the case into at least two separate compartments;

providing a lugged first plate member having a vertical median portion and two integral grid-like frame members extending in opposite lateral directions from the vertical median portions;

pasting the grid-like members with a positive paste material;

folding the first plate member about the central axis of the first plate median portion to form a bighted portion whereby the first plate frame members assume a substantially parallel spaced apart position extending from the bighted portion to provide a bifurcated plate configuration with each of said first plate members providing a pair of pasted positive surfaces;

providing a lugged second plate member having a vertical median portion and two integral grid-like train members extending in opposite lateral directions from the vertical median portion;

pasting the grid-like members with a negative paste material;

folding the second plate frame members about the central axis of the second plate median portion to form a bighted portion whereby the second plate frame members assume a substantially parallel spaced apart position extending from the bighted portion to provide a bifurcated plate configuration with each of said second plate frame members providing a pair of pasted negative surfaces;

fabricating a battery element by interleaving one of the first plate frame members into the bight of the second plate member and toward the bighted second plate median portion spatially separated from the pasted negative surfaces of the second plate frame members and having the plate lugs symetrically positioned with respect to said element;

providing an N-shaped nonconductive separator;

disposing the separator between all adjoining surfaces of said first and second plate members;

inserting a battery element into each cell;

connecting the lugs of the plate members of one polarity in one cell to the lugs of the plate member of the opposite polarity in the adjoining cell by forming an intercell connection; and coupling the unjoined plates in the end-most cells to the terminal connections outside the battery case.

6. The method as defined in claim 5, wherein:

the unjoined plates in the end-most cells being sealingly coupled to terminals through the walls of the battery case.

7. The method of making a storage battery element comprising the steps of providing a lugged first plate member having vertical median portion and two integral grid-like frame members extending in opposite lateral directions from the vertical median portions;

pasting the grid-like members with a positive plate material;

folding the first plate members about a central axis of the first plate median portion to provide a bighted portion whereby the first plate frame members assume a substantially parallel spaced apart position extending from the bighted portion to provide a bifurcated plate configuration each of said first plate frame members providing a pair of pasted positive surfaces;

providing a lugged second plate member having a vertical median portion and two integral grid-like frame members extending in opposite lateral directions from the vertical median portions;

pasting the grid-like members with a negative paste material;

folding the second plate frame member about a central axis of the second plate median portion to provide a bighted portion whereby the second plate frame members assume a substantially parallel spaced apart position extending from the bighted portion to provide a bifurcated plate configuration with each of said second plate frame members providing a pair of pasted negative surfaces;

fabricating the element by interleaving a frame member of one of said plates into the bighted portion of the other of said plates and toward the bighted portion of said other plate spatially separated from the pasted surfaces of said other plate frame members and having the plate lugs symetrically positioned on said element;

providing an N-shaped nonconductive separator; and disposing the separator between all adjoining surfaces of said first and second plate members.

* * * * *